United States Patent
Suzuki et al.

(10) Patent No.: US 7,265,465 B2
(45) Date of Patent: Sep. 4, 2007

(54) SMALL-SIZED MOTOR, SMALL-SIZED VIBRATION MOTOR, AND PORTABLE INFORMATION DEVICE

(75) Inventors: Toshio Suzuki, Tokyo (JP); Takanobu Hoshiba, Tokyo (JP)

(73) Assignee: Namiki Seimitsu Houseki Kabushiki Kaisha, Tokyo (JP)

( * ) Notice: Subject to any disclaimer, the term of this patent is extended or adjusted under 35 U.S.C. 154(b) by 173 days.

(21) Appl. No.: 10/497,606

(22) PCT Filed: Dec. 4, 2002

(86) PCT No.: PCT/JP02/12734

§ 371 (c)(1),
(2), (4) Date: Nov. 3, 2004

(87) PCT Pub. No.: WO03/049254

PCT Pub. Date: Jun. 12, 2003

(65) Prior Publication Data

US 2005/0046302 A1    Mar. 3, 2005

(30) Foreign Application Priority Data

Dec. 4, 2001 (JP) .............................. 2001-370569

(51) Int. Cl.
  *H02K 11/00* (2006.01)
  *H02K 7/06* (2006.01)
  *H01R 39/38* (2006.01)
(52) U.S. Cl. .......................... 310/71; 310/81; 310/239
(58) Field of Classification Search .................. 310/71, 310/239, 81
See application file for complete search history.

(56) References Cited

U.S. PATENT DOCUMENTS 5,117,137 A * 5/1992 Kobayashi ................ 310/49 R (Continued)

FOREIGN PATENT DOCUMENTS

JP         10-117460 A     5/1998

(Continued)

OTHER PUBLICATIONS

Machine translation of JP 2002-044904 (supplied by applicant).*

(Continued)

*Primary Examiner*—Karl Tamai
*Assistant Examiner*—Erik Preston
(74) *Attorney, Agent, or Firm*—Nixon Peabody LLP; Donald R. Studebaker (57) ABSTRACT

The present invention is constituted such that a motor is small in size and can be mounted simply, with a sure electrical connection by means of power terminals. There is provided a terminal seat made of insulating resin fitted and fixed to one end of a motor housing, a pair of support pins are held by the terminal seat so as to project in a direction approximately parallel to a surface of a circuit board and in a cylinder axial direction of the motor housing from the end surface of the terminal seat, respective leads of a motor drive circuit are provided in a plane direction perpendicular to the cylinder axial direction of the motor housing so as to come out from the terminal seat, and there are provided a pair of torsion coil springs as the power terminals that have central spirals fitting over the axes of support pins, ends projecting outward from the terminal seat as points of contact with power supply lands, and opposite ends connected to leads.

6 Claims, 12 Drawing Sheets

U.S. PATENT DOCUMENTS

| | | | |
|---|---|---|---|
| 5,717,271 A * | 2/1998 | Aoki et al. | 310/242 |
| 5,796,058 A * | 8/1998 | Aimi et al. | 200/16 D |
| 5,986,367 A * | 11/1999 | Tsuzaki et al. | 310/71 |
| 5,993,245 A * | 11/1999 | Osada | 439/441 |
| 6,031,313 A * | 2/2000 | Sugai et al. | 310/239 |
| 6,424,064 B2 * | 7/2002 | Ibata et al. | 310/81 |
| 6,740,999 B1 * | 5/2004 | Segawa | 310/81 |
| 2002/0047380 A1 * | 4/2002 | Ibata | 310/89 |
| 2005/0073205 A1 * | 4/2005 | Takagi et al. | 310/89 |

FOREIGN PATENT DOCUMENTS

| | | |
|---|---|---|
| JP | 11-136327 | 5/1999 |
| JP | 11-136901 | 5/1999 |
| JP | 2000-78790 | 10/2000 |
| JP | 2000-299964 A | 10/2000 |
| JP | 2001-238411 A | 8/2001 |
| JP | 2002-44904 A | 8/2003 |

OTHER PUBLICATIONS

International Search Report dated Mar. 25, 2003 for International Application No. PCT/JP 02/12734.

* cited by examiner

PRIOR ART

FIG. 22

PRIOR ART

SMALL-SIZED MOTOR, SMALL-SIZED VIBRATION MOTOR, AND PORTABLE INFORMATION DEVICE

TECHNICAL FIELD

This invention relates to improvement of a small-sized motor and a small-sized vibrating motor in regard to electrical terminals that connect electrically with power supply lands on a circuit board, and improvement of a portable information equipment in which a small-sized vibrating motor is mounted.

BACKGROUND ART

It has previously been proposed (Japanese Patent Laid-Open Publication No. 11-136901) that the method of electrically connecting the power supply lands on the circuit board of a small-seized motor using leads that extend from the motor housing side be replaced by the method of attaching to the exterior of the motor housing leaf-spring power terminals that apply pressure to the power supply lands of the circuit board.

Figure 21:
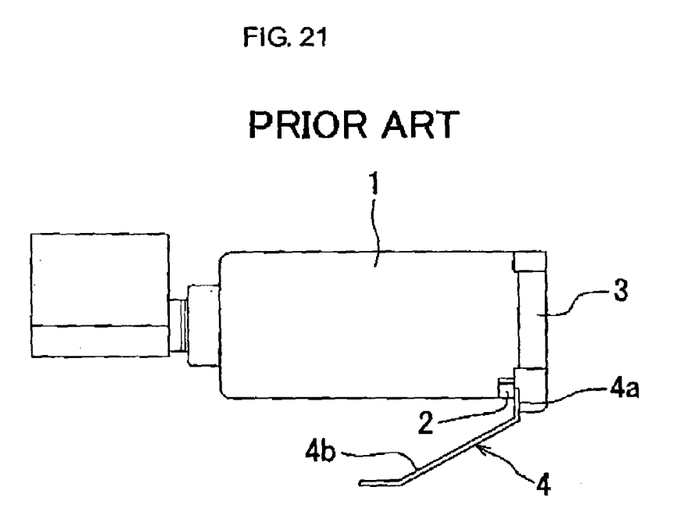
FIG. 21 is a side view illustrating a small-sized vibrating motor according to prior art.

That small-sized motor has, as shown in FIG. 26, a motor housing 1, a brush holder 2 that is fitted and fixed in the open end of the motor housing 1, a bracket 3 that is mutually fixed with the brush holder 2, and a power terminal 4 that consists of a leaf spring bent at an obtuse angle (as shown in the drawing). One end 4a of the power terminal 4 is sandwiched between the brush holder 2 and the bracket 3 where the brush holder 2 is fitted and fixed in the open end of the motor housing 1, and the other end is configured of a free portion 4b that extends down at an angle from the bracket 3 so as to contact and apply pressure to the power supply land on the circuit board.

Figure 22:
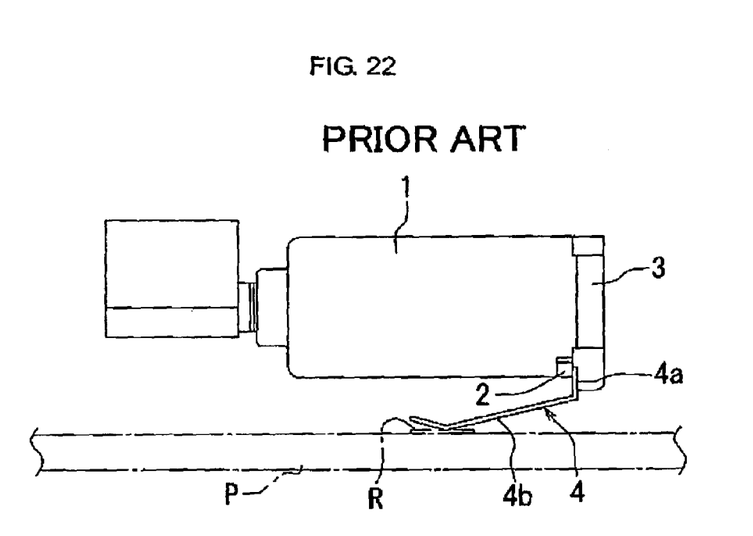
FIG. 22 is a side view illustrating attachment to a circuit board of the small-sized vibrating motor according to the prior art.

The power terminal made of leaf spring will not have the necessary characteristics for practical use if the free portion that is pressed against the power supply land on the circuit board is not long enough relative to the width. Therefore, as shown in FIG. 27, the long part of the free portion 4b that is pressed in contact with the power supply land R of the circuit board P must be mounted so that the motor itself floats above the surface of the circuit board P; it is therefore to maintain a considerable allowance in the mounting height of the power terminal 4. This puts constraints on the ability to reduce the mounting height, and prevents efforts to miniaturize the motor itself and the equipment in which it is mounted.

Additionally, using a power terminal made of leaf spring, there is the risk that when it applies pressure on the board, torsion will cause the two power terminals to bend toward each other. Moreover, the pressure applied on the power supply land on the circuit board depends on the springiness of the leaf spring. Therefore, unless the motor is mounted at the proper height to accurately maintain pressure between the free portion of the leaf spring and the power supply land of the circuit board, there is the danger that poor contact will occur in connection with vibration of the small-sized vibrating motor or the like.

In order to supplement the pressure contact between the power supply land of the circuit board and the leaf spring, it has been proposed (Japanese Patent Laid-Open Publication No. 2000-78790) that a flexible pressure body, to hold back the tip of the free portion, be installed between the motor housing and the free portion of the leaf spring. However, even with this proposal there is a height restraint equal to the thickness of the flexible body, and so efforts to miniaturize the motor itself and the equipment in which it is mounted are prevented.

The present invention has an object of providing a small-sized motor and a small-sized vibrating motor in which the motor itself is small in size and can be mounted simply, with a sure electrical connection by means of power terminals.

The present invention has another object of providing a smaller equipment in which the small-sized vibrating motor is mounted, and thus providing portable information equipment of high reliability in which the motor is electrically connected by power terminals.

DISCLOSURE OF THE INVENTION

The small-sized motor of the present invention is constituted such that it has a pair of power terminals external to a motor housing, the power terminals being electrically connected to respective leads from a motor drive circuit assembled inside the motor housing, with electrical power to the motor conducted through a pressure connection between the power terminals and power supply lands on a circuit board, and such that there is provided a terminal seat made of insulating resin fitted and fixed to one end of the cylindrical motor housing, a pair of support pins are held by the terminal seat so as to project in a direction approximately parallel to a surface of the circuit board and in a cylinder axial direction of the motor housing from the end surface of the terminal seat, respective leads of the motor drive circuit are provided in a plane direction perpendicular to the cylinder axial direction of the motor housing so as to come out from the terminal seat, and there are provided a pair of torsion coil springs as the power terminals that have central spirals fitting over the axes of the support pins, ends projecting outward from the terminal seat as points of contact with the power supply lands, and opposite ends connected to the leads.

The small-sized motor of the present invention is further constituted such that there is provided a terminal seat fitted and fixed to one end of the motor housing, a pair of support pins are provided so as to project from an end surface of the terminal seat in the same direction, respective leads of the motor drive circuit are provided so as to come out from the end surface of the terminal seat, and there are provided torsion coil springs at one end of the motor housing as the pair of power terminals that have central spirals fitting over the axes of the support pins, ends projecting outward from the terminal seat as points of contact with the power supply lands, and opposite ends connected and fixed to the leads coming out from the end surface of the terminal seat.

The small-sized motor of the present invention is further constituted such that it has the torsion coil springs of which the contact point is curved in a U-shape, and the terminal seat on the end of which are check rims that stop the contact points that twist and displace when pressed in contact with the power supply lands.

The small-sized motor of the present invention is further constituted such that there is provided a terminal seat with a base portion that extends from the portion fitted to one end of the motor housing and matches with the wall of the motor housing, a pair of support pins are provided so as to project in two directions from the sides of the base portion, respective leads of the motor drive circuit are provided so as to come out from an end surface of the portion fitted, and there are provided torsion coil springs at the side of the motor housing as the pair of power terminals that have central spirals fitting over the axes of the support pins, ends projecting outward from the base portion as points of contact with the power supply lands, and opposite ends connected and fixed to the leads coming out from the end surface of the portion fitted.

The small-sized motor of the present invention is further constituted such that it has the terminal seat with stop rims that hold the axes for connection to which the leads of the motor drive circuit are connected and fixed.

The small-sized motor of the present invention is further constituted such that it has the terminal seat with a tab fitted and fixed into a cut-out in the surface of the circuit board.

Further, the small-sized vibrating motor of the present invention is constituted such that it has a cylindrical motor housing, a rotor shaft that is bearing-supported inside the motor housing, a magnet and coil assembled on the center line of the rotor shaft, a commutator fixed on the center line of the rotor shaft, brush seats made of insulating resin fitted and fixed at one end of the motor housing, a pair of brushes held by the brush seats in rubbing contact with the commutator, a pair of power terminals mounted outside the motor housing, and an eccentric weight mounted on one end of the rotor shaft that projects outside the motor housing, the coil being electrically connected to the commutator, the power terminals being electrically connected to the ends of the respective brush leads of brushes, and the power terminals conducting electricity by means of pressure contact with the power supply lands on the a circuit board, and such that there is provided a terminal seat that also serves as the brush seats, a pair of support pins are held by the terminal seat so as to project in a direction approximately parallel to a surface of the circuit board and in a cylinder axial direction of the motor housing from the end surface of the terminal seat, respective leads are provided in a plane direction perpendicular to the cylinder axial direction of the motor housing so as to come out from the end surface of the terminal seat, and there are provided a pair of torsion coil springs as the power terminals that have central spirals fitting over the axes of the support pins, ends projecting outward from the terminal seat as points of contact with the power supply lands, and opposite ends connected to the respective leads of brushes.

Further, the portable information equipment of the present invention is constituted such that it is equipped with the small-sized vibrating motor as described above.

BEST MODE FOR CARRYING OUT THE INVENTION

Figure 1:
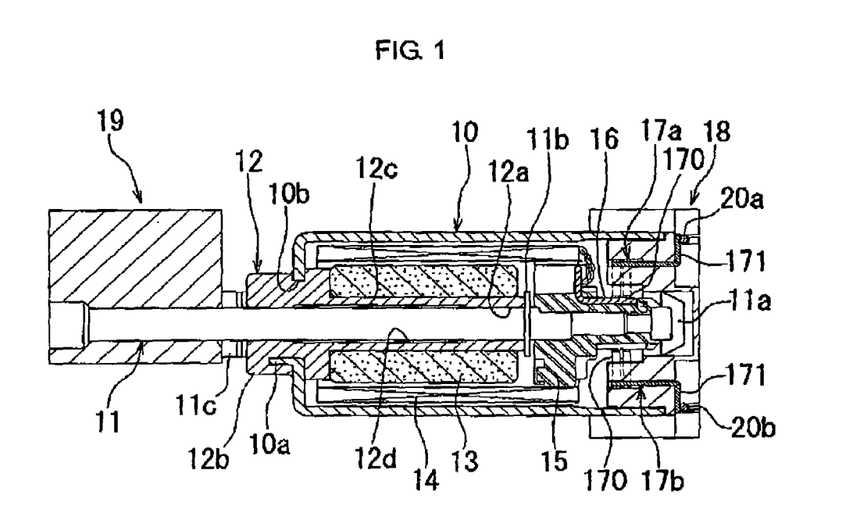
FIG. 1 is a sectional side view illustrating a small-sized vibrating motor according to one embodiment of the small-seized motor of the present invention.

The following description is made with reference to FIGS. 1 through 20. Of a small-sized motor for which embodiments are illustrated, a small-sized vibrating motor that rings by means of vibration, as shown in FIG. 1, is taken as an example. In this embodiment, the most important structural element is the structure of a power terminal, which comprises a torsion coil spring that is pressed against a power supply land on a circuit board.

The small-sized vibrating motor has a motor housing 10, a rotor shaft 11, a bearing and bearing housing 12, a magnet 13, a coil 14, a coil holder 15, a commutator 16, a pair of brushes 17*a*, 17*b*, a brush holder and terminal seat 18, and an eccentric weight 19, and a pair of power terminals 20*a*, 20*b*. They are assembled with the magnet 13 fitted and fixed to the outer periphery of the bearing housing 12 as a stator, and the coil 14 held in place in the coil holder 15 around the axis of the rotor shaft 11 as the rotor.

As shown in FIG. 1, the motor housing 10 is made of metal in a cupped shape, with one end closed and the other end open. One end of the motor housing 10 has a projecting tab 10*a* and a cut-out 10*b* that fix the motor housing together as a single unit with the bearing housing 12, which is molded of resin material that provides ample lubricity, wear resistance, hardness, and toughness. The rotor shaft 11 is supported within the bearing housing 12.

The bearing housing 12 has a through hole 12a through which the rotor shaft 11 is inserted, and is formed with a retainer 12b that holds the closed end of the bearing housing 10 by both sides of the cut-out 10b, a sleeve 12c that extends inside the motor housing 10 from the retainer 12b, and an oil sump 12d which is sunken into the inner surface of the through hole 12a. The bearing housing 12 is assembled with the sleeve 12c held in place by a collar 11b that is fitted about the center line of the rotor shaft 11, and with the retainer 12b separated from the eccentric weight 19 by a spacing ring 11c that is interposed between the bearing housing 12 and the eccentric weight 19.

The magnet 13 is fitted and fixed to the outer periphery of the sleeve 12 so as to form a single piece with the bearing housing 12. This magnet 13 is accommodated within the coil 14, from which it is separated by a magnetic gap. The coil 14 is held by a coil holder 15 that is fitted and fixed about the center line of the rotor shaft 11. The coil holder has on its outer periphery a commutator 16 that is divided into two poles; the commutator 16 is electrically connected to the ends of the cylindrical coil 14.

The brushes 17a, 17b are held by the brush holder/terminal seat 18 and make rubbing contact with the commutator 16. The brushes 17a, 17b are also electrically connected, as described below, to a pair of power terminals 20a, 20b. This pair of power terminals 20a, 20b are made to contact and apply pressure to the power supply lands on the circuit board, and are electrically conductive; in this way the motor drive circuit is a part of the circuitry.

Figure 2:
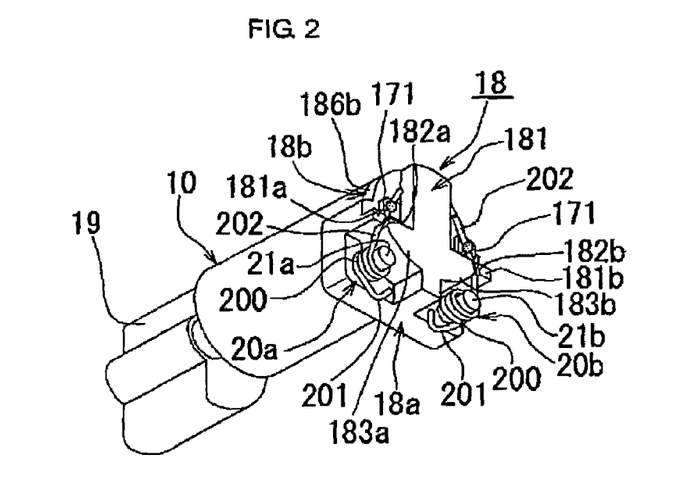
FIG. 2 is an oblique perspective view illustrating the small-sized vibrating motor according to the first embodiment of the present invention.
Figure 3:
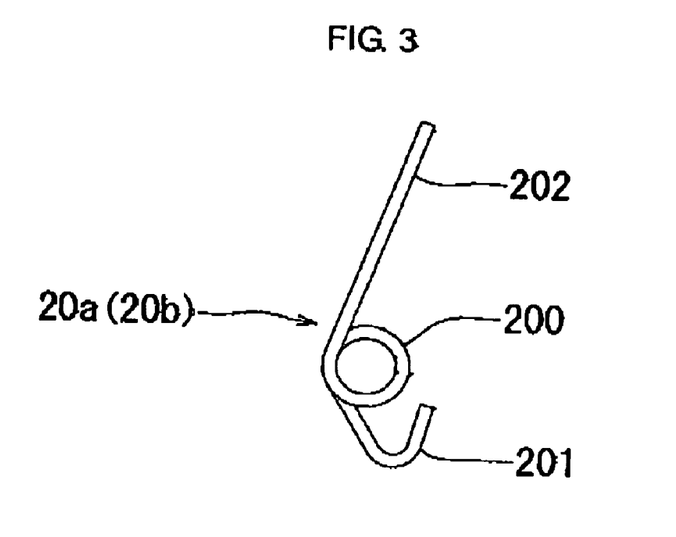
FIG. 3 is an elevation view illustrating a power terminal end of a torsion coil spring used in the small-sized vibrating motor of FIG. 2.

The power terminals 20a, 20b, as shown in FIG. 2, comprise torsion coil springs with helical moment. As shown in FIG. 3, the power terminal 20a (20b) is bent from a conductive bar with its spiral portion 200 at the center, a U-shaped curve at one end of the spring 201 that forms a point of contact with the power supply land of the circuit board, and the other end 202 that is a contact piece, electrically connected to the end of a lead from the brushes 17a, 17b.

Figure 4:
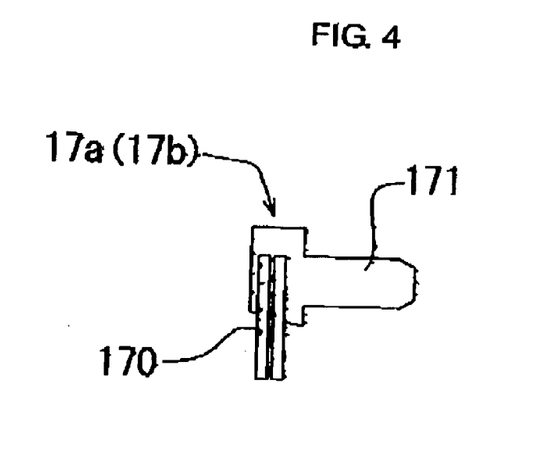
FIG. 4 is a side view illustrating a brush used in the small-sized vibrating motor of FIG. 2.
Figure 5:
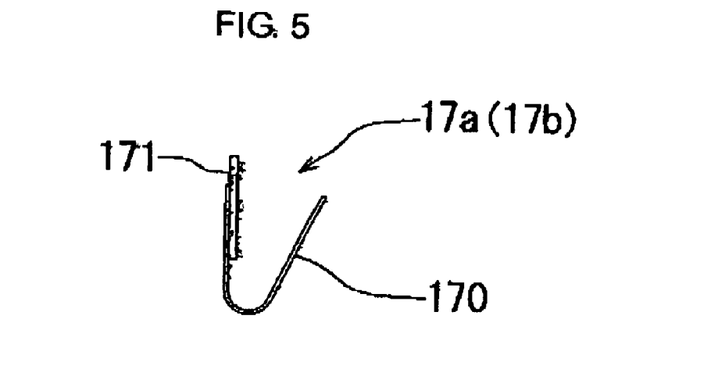
FIG. 5 is an elevation view illustrating the brush of FIG. 4.

As shown in FIGS. 4 and 5, the brush 17a (17b) comprises multiple brush ends 170, made of conductive wire, connected to and held in place by a lead end 171, which is made of a conductive sheet material. The brush ends 170 are curved in a U-shape to maintain rubbing contact with spring pressure against the outer periphery of the commutator 16. The pair of brushes 17a, 17b are set parallel to each other, pointing in opposite directions so as to make rubbing contact over the center line of the rotor shaft 11.

The brush seat/terminal seat 18, molded of an insulating resin, is the base in which the power terminals 20a, 20b and brushes 17a, 17b are mounted. The brush seat/terminal seat (hereafter, referred to as "terminal seat") 18 comprises a base portion 18a and a fitting portion 18b, with the structure differing between the side where power terminals 20a, 20b are mounted and the side where the brushes 17a, 17b are mounted.

Figure 6:
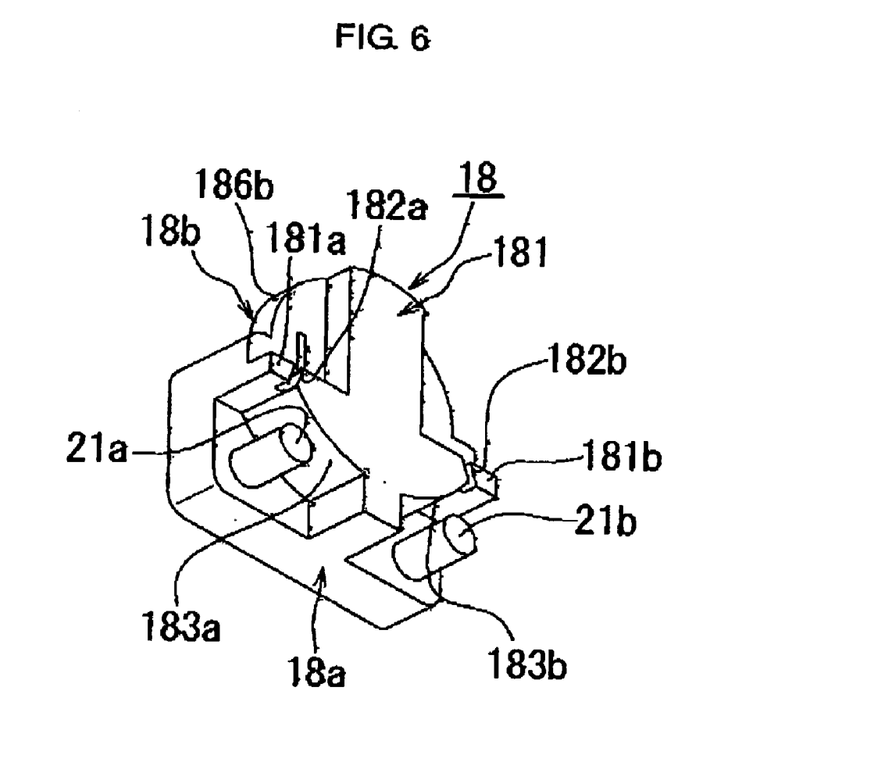
FIG. 6 is an oblique perspective view with an angle of elevation illustrating a terminal seat, as seen from a power terminal attached side, used in the small-sized vibrating motor of FIG. 2.
Figure 7:
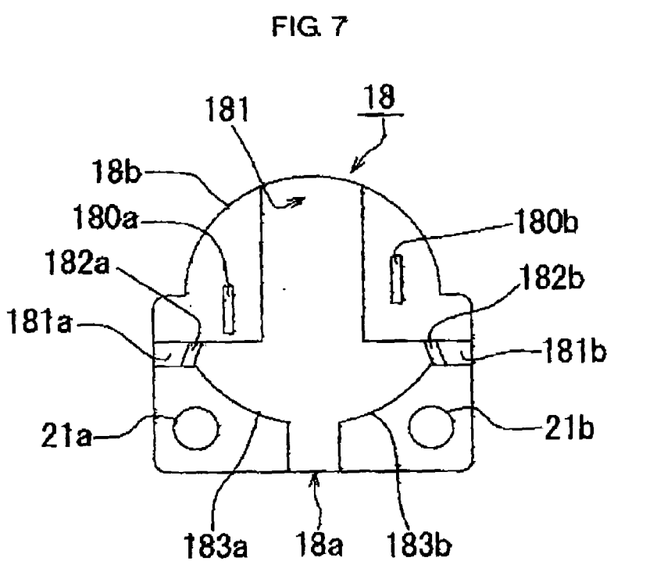
FIG. 7 is an elevation view illustrating the terminal seat of FIG. 6, as seen from the power terminal attached side.

To describe these terminals and the structure of the seat on the basis of the first embodiment, the side on which the power terminals 20a, 20b are mounted has, as shown in FIGS. 6 and 7, support pins 21a, 21b, in the form of cylindrical posts, which project outward from the outer side of the base portion 18a and are approximately parallel to the surface of the circuit board (not illustrated). These support pins 21a, 21b can be inserted in the back of the terminal seat 18 after it is molded, or they can be molded as projections in a single piece with the terminal seat 18.

On the outer surface of the fitting portion 18b are slits 180a, 180b, which are openings that pass through to the side where the brushes 17a, 17b are mounted. The locations of the slits 180a, 180b are offset vertically because, as described above, the pair of brushes 17a, 17b are mounted in opposite directions, one up and one down.

The positions from which the support pins 21a, 21b project and the positions where the lead ends 171 pass through are separated by a roughly cross-shaped partition wall 181 on the outward side of the base portion 18a and the fitting portion 18b of the terminal seat 18.

On transverse walls 181a, 181b of the partition wall 181 are notches 182a, 182b which communicate between the positions where support pins 21a, 21b project and the positions of the guides for lead ends 171. The transverse walls 181a, 181b are a stop rim in which the straight spring ends 202 (contact pieces) that extend from the spiral portion 200 of the power terminals 20a, 20b are held in place in by the notches 182a, 182b that slant up toward the centerline.

The cross-shaped intersection of walls has check rims 183a, 183b that swell out in an arc. By this means, as the U-shaped spring ends 201 (hereafter, denoted by "contact point (201)" when necessary) of the power terminals 20a, 20b are pressed into contact with the power supply lands of the circuit board, the spring displacement curves easily along the arc surface, and the contact point (201) undergoing spring displacement is stopped by the check rims 183a, 183b, so that the contact points (201) of the power terminals 20a, 20b are pressed firmly in contact with the power supply lands of the circuit board.

Figure 8:
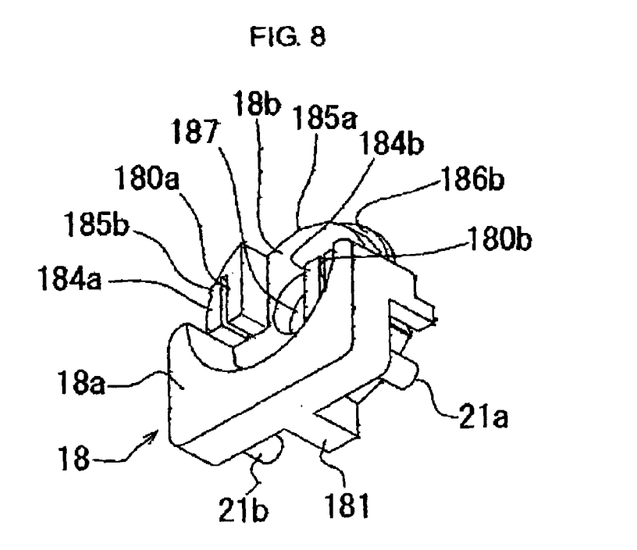
FIG. 8 is an oblique perspective view with an angle of elevation illustrating the terminal seat of FIG. 6, as seen from a brush attached side.
Figure 9:
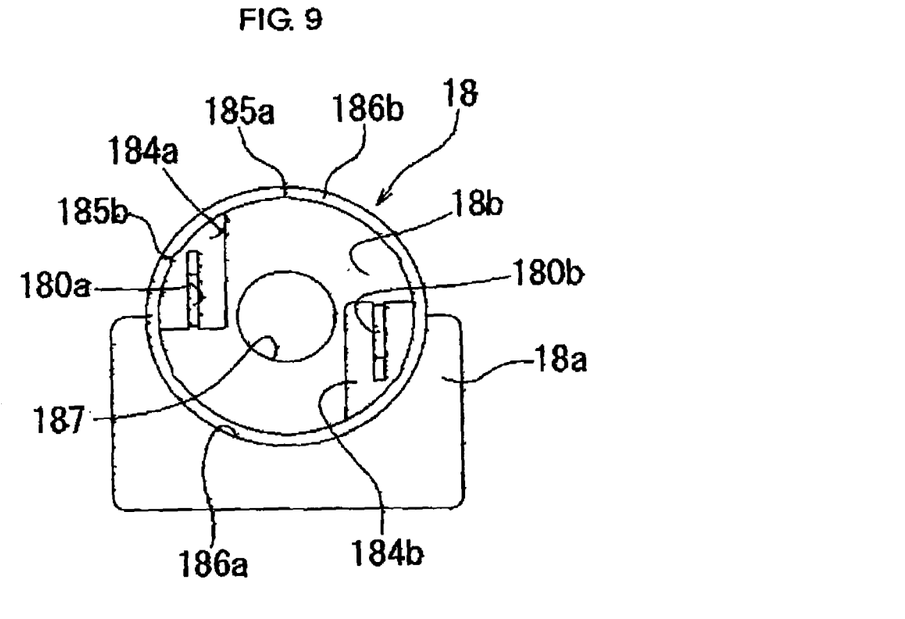
FIG. 9 is an elevation view illustrating the terminal seat of FIG. 8, as seen from the brush attached side.

On the side where the brushes 17a, 17b are mounted, as shown in FIGS. 8 and 9, lead holders 184a, 184b project from the inside surface of the terminal seat fitting 18b. The above mentioned slits 180a, 180b, through which the lead ends 171 of the brushes 17a, 17b are inserted, connect through from the lead holders 184a, 184b to the outside surface of the fitting portion 18b.

On the inside face of the fitting portion 18b there are multiple thickened lips 185a, 185b that surround the lead holders 184a, 184b, the outer periphery of which fit into the opening of the motor housing 10, and there is a check rim 186b that rises from the groove 186a and is concentric with it. Also located on the inside face of the fitting portion 18b is a round depression 187 that receives the end 11a of the rotor shaft 11.

The terminal seat 18, including the structural parts described above, is molded with the base portion 18 extending out ward beyond the sides of the motor housing 10 and the fitting portion 18b being roughly the same size as the open end of the motor housing 10. Moreover, the support pins 21a, 21b rise from the base portion of the terminal seat 18 so as to be within the height range of the partition wall 181.

Figure 10:
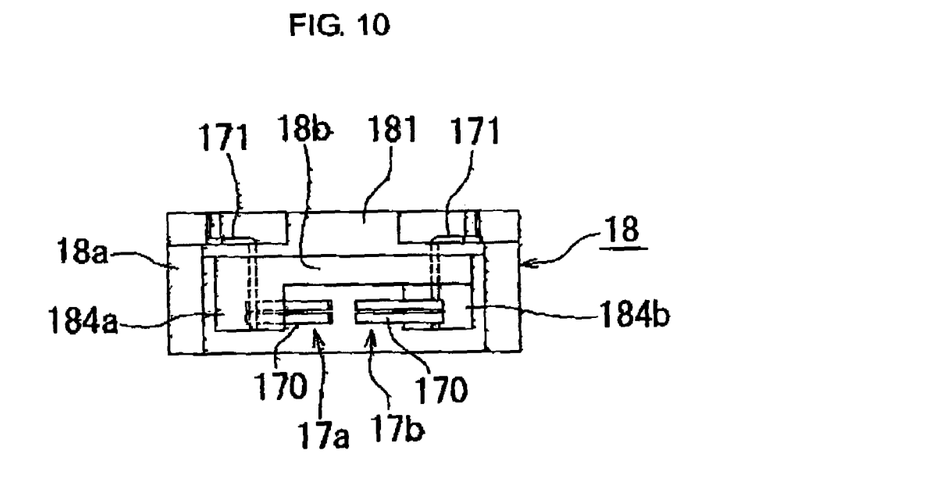
FIG. 10 is a plan view illustrating the terminal seat with the brushes of FIG. 4 mounted.
Figure 11:
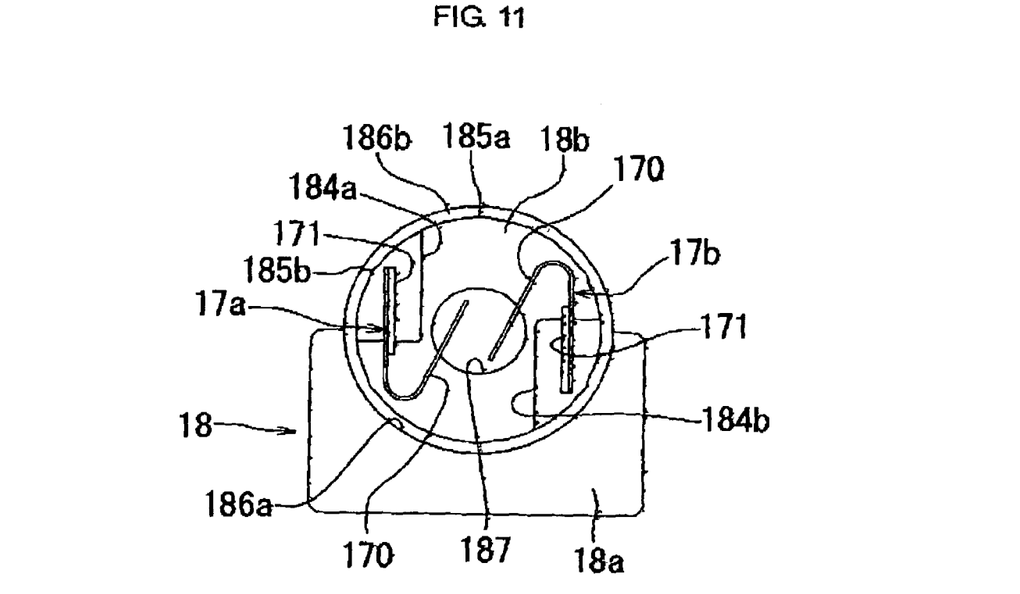
FIG. 11 is an elevation view illustrating the terminal seat with the brushes of FIG. 4 mounted.

The brushes 17a, 17b are mounted with brush ends 170 pointing opposite directions within the terminal seat 18 holders, as shown in FIGS. 10 and 11, and the lead ends 171 inserted through slits 180a, 180b of the lead holders 184a, 184b so that the lead ends bend after passing through to the outside face of the fitting portion 18b.

Figure 12:
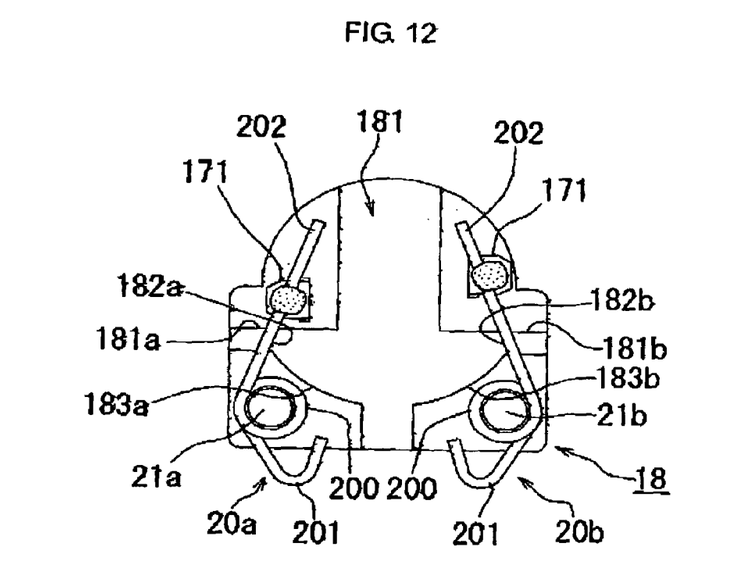
FIG. 12 is a plan view illustrating the terminal seat with the torsion coil springs of FIG. 3 mounted as power terminals.

As shown in FIG. 12, the power terminals 20a, 20b are mounted with central spirals 200 fitting over the axes of the support pins 21a, 21b, ends 201 projecting outward from the base portion 18a of the terminal seat 18 as terminal points (201) that contact the power supply lands, opposite ends 202 that fit in and are held by notches 182a, 182b of the transverse wall 181a, 181b that is a stop rim and soldered to the ends of the leads 171. The power terminals 20a, 20b are positioned with the spring ends 201 positioned inside the arced face of the check rims 183a, 183b.

Figure 13:
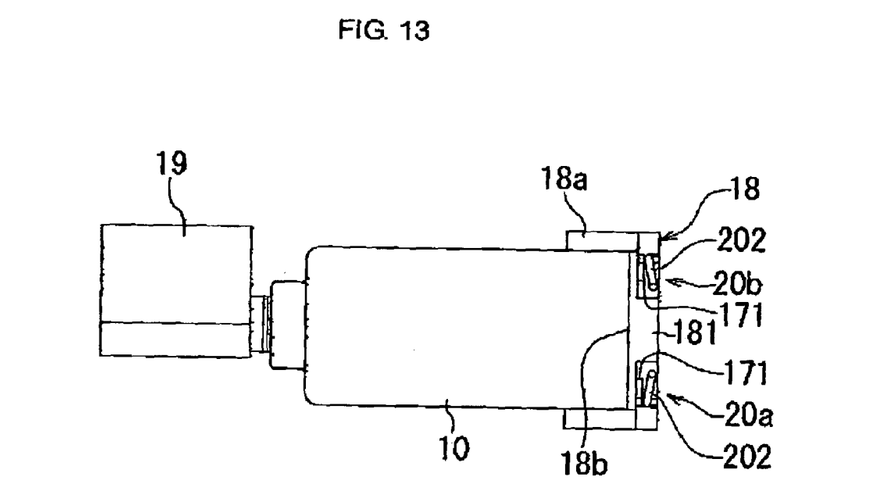
FIG. 13 is a bottom view illustrating the small-sized vibrating motor of FIG. 2.
Figure 14:
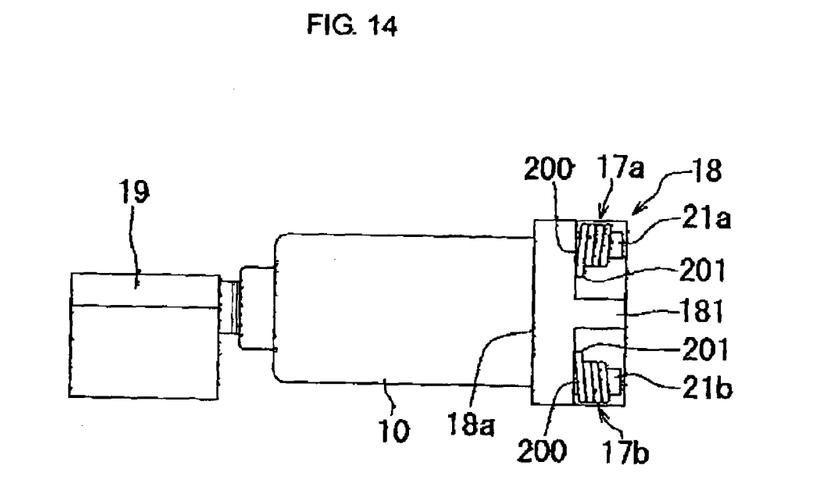
FIG. 14 is a plan view illustrating the small-sized vibrating motor of FIG. 2.
Figure 15:
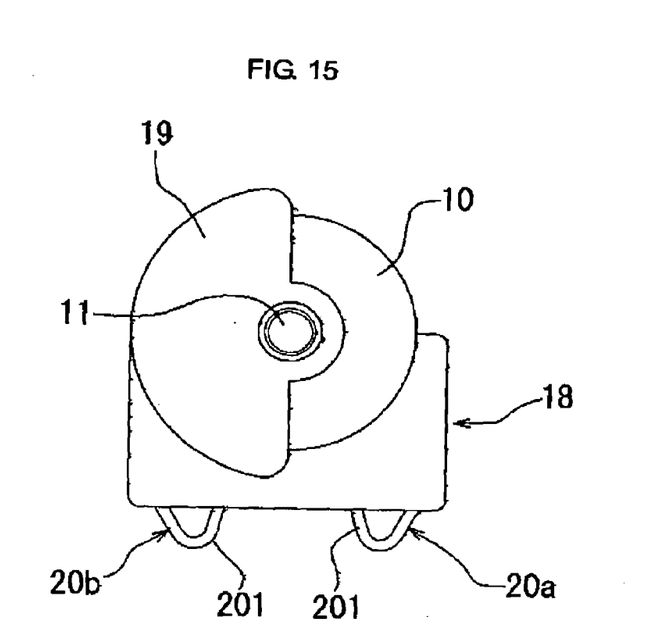
FIG. 15 is an elevation view illustrating the small-sized vibrating motor of FIG. 2 as seen from an eccentric weight end.

As shown in FIG. 13, the terminal seat 18 is mounted so that the open end of the motor housing 10 is in contact with the receiver rim 186b of the fitting portion 18b and the lead holders 184a, 184b fit inside the motor housing 10, which is fitted to the groove 186a of the terminal fitting 18b. The mounted terminal seat 18, as shown in FIG. 14, has its base portion 18a located inward of the open end of the motor housing 10. As shown in FIG. 15, the spring ends 201, which form the contact points of the power terminals 20a, 20b, project downward from the terminal seat 18.

Figure 16:
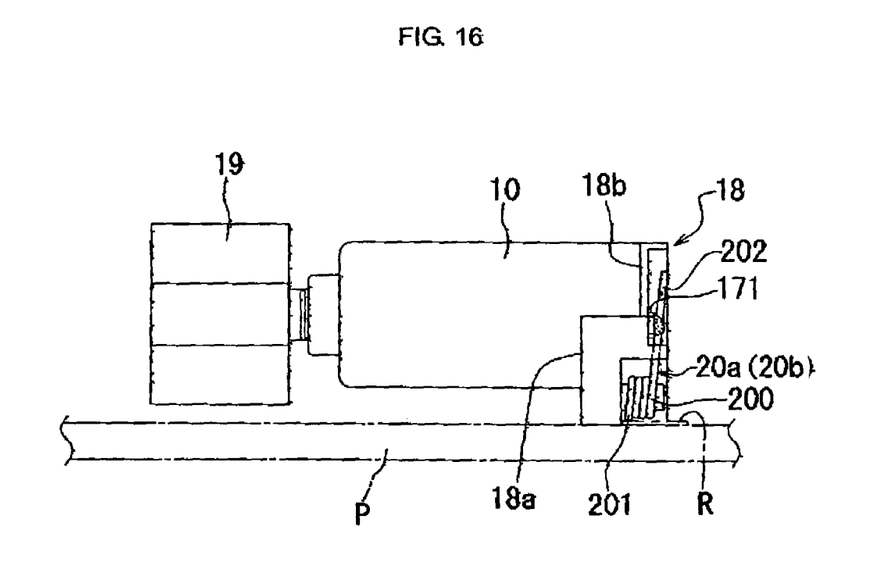
FIG. 16 is a side view illustrating a mode of attachment of the small-sized vibrating motor of FIG. 2 to a circuit board.

The small-sized vibrating motor thus constituted is mounted inside the case of the equipment so that, as shown in FIG. 16, the base portion 18a of the terminal seat 18 is against the surface of the circuit board P and the contact point (201) of the power terminal 20a (20b) is pressed into contact with the power supply land R of the conductive pattern.

Figure 17:
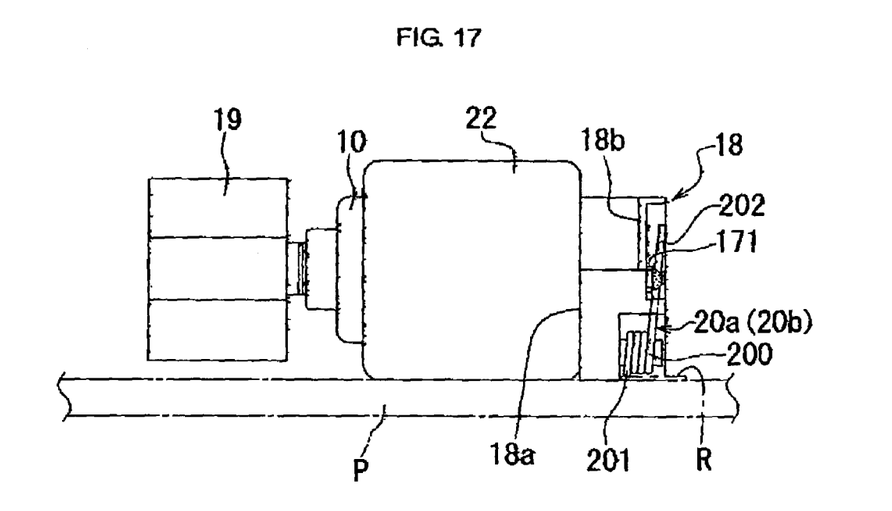
FIG. 17 is a side view illustrating another mode of attachment of the small-sized vibrating motor of FIG. 2 to the circuit board.

This small-sized vibrating motor can have its motor housing 10 covered by a ring 22 of flexible material, as shown in FIG. 17, or the motor housing 10 can be received in a semicircular support seat made of flexible material that is interposed between the motor housing 10 and the surface of the circuit board P in order to position the motor as a whole above the surface of the circuit board P. In these cases, the motor as a whole is mounted stably on the circuit board P.

Figure 18:
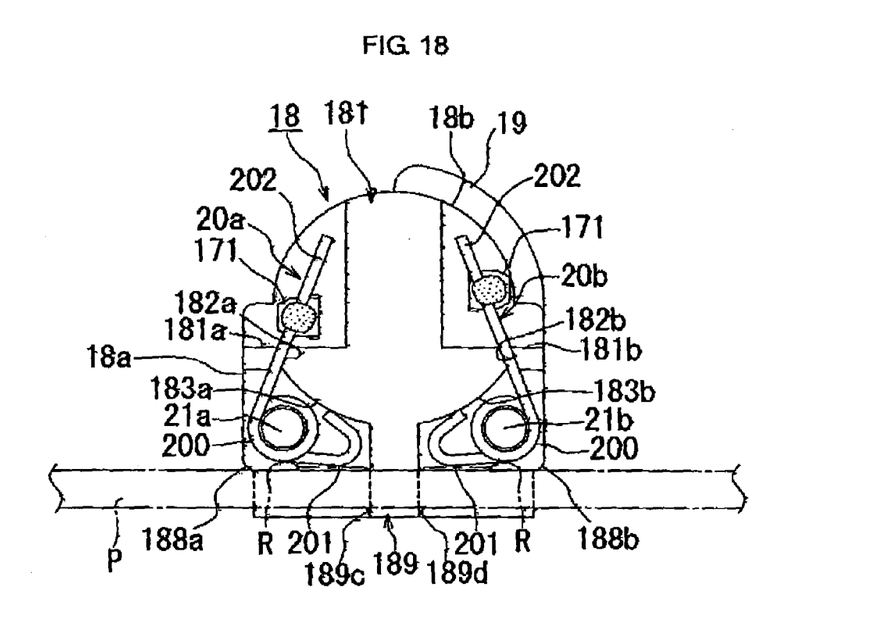
FIG. 18 is an elevation view illustrating, from the power terminal side, a mode of attaching the small-sized vibrating motor of FIG. 2 by means of a tab on the terminal seat.
Figure 19:
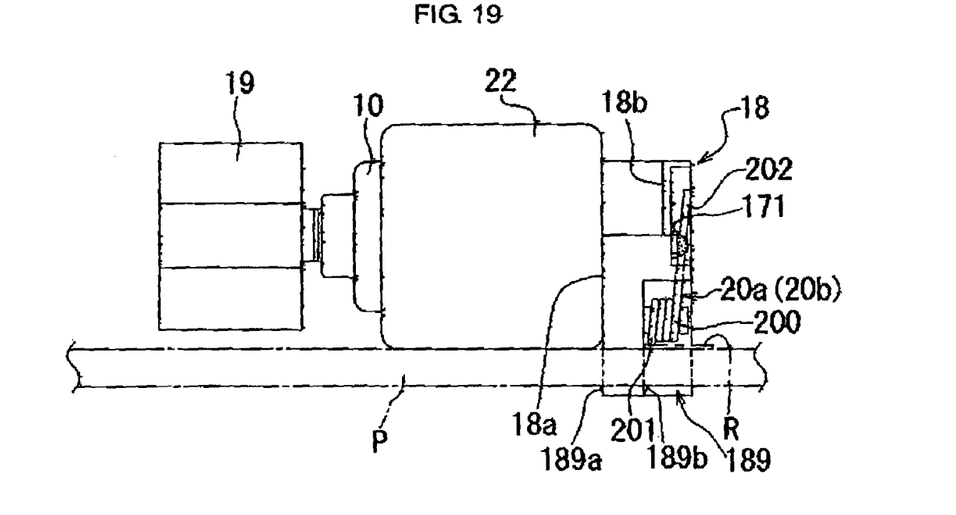
FIG. 19 is a side view illustrating the mode of attachment of the small-sized vibrating motor of FIG. 18.

It is also possible, as shown in FIG. 18, to constitute the terminal seat 18 sit catch rims 188a, 188b on either side and the base portion 18a and partition wall 181 extending downward for the thickness of the circuit board P to form a tab 189. Matching the outer dimensions of this tab, there is a level T-shaped cut-out (indicated by broken lines) in the circuit board P separated from the power lands R, so that the tab 189 fits into the cut-out as shown in FIG. 19. In this case, the power terminals 20a, 20b are positioned together with the power supply lands R and the motor as a whole can be mounted stably with the ring 22 or the support seat sandwiched firmly in place.

This tab 189 can have catch claws 189a through 189d located along the lower edge of the tab 189, as shown in FIGS. 18 and 19. Because the tab 189 matches the cut-out in the circuit board P, these catch claws 189a through 189d engage the edge of the cut-out and prevent the motor as a whole, including the terminal seat 18, from coming out of the cut-out in the circuit board P.

Figure 20:
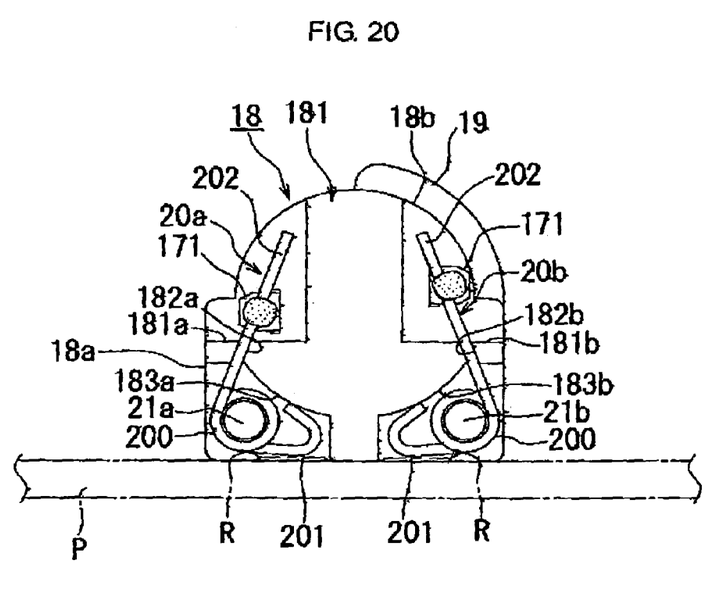
FIG. 20 is an elevation view illustrating, from the power terminal side, the small-sized vibrating motor when attached to the circuit board of FIG. 16.

When the power terminals 20a, 20b of the motor are pressed into contact with the power supply lands R of the circuit board P, the torsion moment of the torsion coil springs acts on the support pins 21a, 21b as shown in FIG. 20, and the contact points (201) of the power terminals 20a, 20b are displaced inward from the base portion 18a of the terminal seat 18. When the motor as a whole reaches its lower limit against the surface of the circuit board P (the mounting height), the spring ends 201 of the power terminals 20a, 20b are stopped by the arced face of the check rims 183a, 183b.

In this small-sized vibrating motor, the contact points (201) of the power terminals 20a, 20b are displaced inward from the base portion 18a of the terminal seat 18 and pressed into contact with the power supply lands R of the circuit board P, and so the mounting height of the motor as a whole is limited to the height of the terminal base 18a. In particular, it is possible to mount the base portion 18a of the terminal base 18 directly on the surface of the circuit board P with no insulating material in between, and to achieve small size by limiting the mounting height of the motor as a whole.

With regard to the motor drive circuit, the contact points of the U-shaped spring ends 20a act on the power lands R of the circuit board P with a force to counter the torsion moment from the torsion coil spring. Further, the spring ends 201 that are displaced by contact with the power supply lands R of the circuit board P are checked by the check rims 183a, 183b, and the contact points (201) of the power terminals 20a, 20b are pressed in contact with the power supply lands of the circuit board P, and so there is steady electrical continuity through the power terminals 20a, 20b.

Additionally, the other ends 202 of the contact side of the power terminals 20a, 20b that are soldered to the leads 171 from the brushes 17a, 17b are held in place by the stop rims, and so the torsion moment of the torsion coil springs does not act on the contact points 201 of the power terminals 20a, 20b that are soldered to the leads 171 of the brushes 17a, 17b, and so the circuit structure is stable.

In this small-sized vibrating motor, it is possible to make the electrical connection by causing the contact points on the spring ends 201 of the power terminals 20a, 20b to undergo spring displacement and be pressed into contact with the power supply lands of the circuit board on the inward side of the base portion 18a of the terminal seat 18. In this way the mounting height of the motor as a whole is limited to the height of the terminal base 18a. Again, a force that counters the torsion moment from the torsion coil spring acts on the power supply lands of the circuit board, and can press the contact points on the power terminals 201, 20b into contact with the power supply lands of the circuit board, so that there is steady electrical continuity through the power terminals 20a, 20b.

The small-sized vibrating motors of the first and second embodiments can be installed as vibrational ring-style alarm devices in pagers, mobile telephones and other portable telecommunications equipment. Because the mounting height of the motor as a whole in such portable telecommunications equipment can be limited to the height of the terminal seat 18, it is possible to reduce the overall size of the equipment, and a sure electrical connection can be made by the pressure contact of the contact points (201) of the power terminals 20a, 20b against the power supply lands of the circuit board, thus constituting equipment of high reliability.

The embodiments described above were explained on the basis of small-sized vibrating motors with brushes, but the constitution of the circuit by means of power terminals can be applied, in terms of structure, to brushless motors and other small-sized motors, or in terms of application to small-sized motors used for output of a rotary drive.

INDUSTRIAL APPLICABILITY

As stated above, according to the small-sized motor of the present invention, there is provided the terminal seat made of insulating resin fitted and fixed to one end of the motor housing, a pair of support pins are held by the terminal seat so as to project in the direction approximately parallel to the surface of the circuit board, the respective leads of the motor drive circuit are provided so as to come out from the terminal seat, and there are provided a pair of torsion coil springs as the power terminals that have the central spirals fitting over the axes of the support pins, the ends projecting outward from the terminal seat as points of contact with the power supply lands, and the opposite ends connected to the leads. Accordingly, the contact points of the power terminals are displaced inward from the terminal seat and are pressed into contact with the power supply lands of the circuit board, enabling electrical connectivity, so that the mounting height of the motor overall can be limited to the height of the terminal base, and the force, countering the torsion moment of the torsion coil spring, acting on the power supply lands of the circuit board applies flexible pressure of the contact points of the power terminals on the power supply lands of the circuit board, to provide steady electrical connectivity.

Also, there is provided the terminal seat fitted and fixed to one end of the motor housing, a pair of support pins are provided so as to project from the end surface of the terminal seat in the same direction, the respective leads of the motor drive circuit are provided so as to come out from the end surface of the terminal seat, and there are provided torsion coil springs at one end of the motor housing as the pair of power terminals that have central spirals fitting over the axes of the support pins, the ends projecting outward from the terminal seat as points of contact with the power supply lands, and the opposite ends connected and fixed to the leads coming out from the end surface of the terminal seat. Accordingly, the power terminals can be accommodated within the end face of the terminal seat, and the length of the motor as a whole can be kept short.

Also, it has the torsion coil springs of which the contact point is curved in the U-shape, and the terminal seat on the end of which are check rims that stop the contact points that twist and displace when pressed in contact with the power supply lands. Accordingly, a force countering the torsion moment of the torsion coil springs can act on the power supply lands of the circuit board, which can steadily apply flexible pressure of the contact points of the power terminals on the power supply lands of the circuit board.

Also, there is provided the terminal seat with the base portion that extends from the portion fitted to one end of the motor housing and matches with the wall of the motor housing, a pair of support pins are provided so as to project in two directions from the sides of the base portion, the respective leads of the motor drive circuit are provided so as to come out from the end surface of the portion fitted, and there are provided the torsion coil springs at the side of the motor housing as the pair of power terminals that have the central spirals fitting over the axes of the support pins, the ends projecting outward from the base portion as points of contact with the power supply lands, and the opposite ends connected and fixed to the leads coming out from the end surface of the portion fitted. Accordingly, the power terminals can be accommodated within the two sides of the terminal seat, and the length of the motor as a whole can be kept short.

Also, it has the terminal seat with stop rims that hold the axes for connection to which the leads of the motor drive circuit are connected and fixed, so that the connecting point of the power terminals which are soldered with the leads of the motor drive circuit are held by the stop rims. Accordingly, the torsion moment of the torsion coil springs does not act on the contact points of the power terminals, and the constitution of the circuit is stable.

Also, it has the terminal seat with the tab fitted and fixed into the cut-out in the surface of the circuit board. Accordingly, the motor as a whole can be mounted on the surface of the circuit board by aligning the power terminals with the power supply lands.

Also, there is provided the terminal seat that also serves as the brush seats, a pair of support pins are held by the terminal seat so as to project in the direction approximately parallel to the surface of the circuit board, the respective leads are provided so as to come out from the end surface of the terminal seat, and there are provided a pair of torsion coil springs as the power terminals that have the central spirals fitting over the axes of the support pins, the ends projecting outward from the terminal seat as points of contact with the power supply lands, and the opposite ends connected to the leads of brushes. Accordingly, since it is possible to make the electrical connection by causing the contact points of the power terminals to undergo spring displacement and be pressed into contact with the power supply lands of the circuit board on the inward side of the terminal seat, the mounting height of the motor as a whole can be limited to the height of the terminal base. Further, since the force, countering the torsion moment of the torsion coil spring, acting on the power supply lands of the circuit board applies flexible pressure of the contact points of the power terminals on the power supply lands of the circuit board, the steady electrical connectivity can be provided.

Also, according to the portable information equipment of the present invention, since the above-described small-sized vibrating motor is mounted therein, it can allows the equipment as a whole to be made smaller and allows a sure electrical connection to be made by the pressure contact of the contact points of the power terminals against the power supply lands of the circuit board, thus constituting equipment of high reliability.

The invention claimed is:

1. A small-sized motor, in which there is provided a pair of power terminals external to a motor housing, the power terminals being electrically connected to respective leads from a motor drive circuit assembled inside the motor housing, with electrical power to the motor conducted through a pressure connection between the power terminals and power supply lands on a circuit board, characterized in that there is provided a terminal seat made of insulating resin fitted and fixed to one end of the cylindrical motor housing, a pair of support pins are held by the terminal seat so as to project in a direction approximately parallel to a surface of the circuit board and in a cylinder axial direction of the motor housing from the end surface of the terminal seat, respective leads of the motor drive circuit are provided in a plane direction perpendicular to the cylinder axial direction of the motor housing so as to come out from the terminal seat, and there are provided a pair of torsion coil springs as the power terminals that have central spirals fitting over the axes of the support pins, ends projecting outward from the terminal seat as points of contact with the power supply lands of the circuit board, and opposite ends connected to the respective leads.

2. The small-sized motor as described in claim 1, characterized by having the torsion coil springs of which the contact point is curved in a U-shape, and the terminal seat on the end of which are check rims that stop the contact points that twist and displace when pressed in contact with the power supply lands.

3. The small-sized motor as described in claim 1, characterized by having the terminal seat with stop rims that hold the axes for connection to which the respective leads of the motor drive circuit are connected and fixed.

4. The small-sized motor as described in claim 1, characterized by having the terminal seat with a tab fitted and fixed into a cut-out in the surface of the circuit board.

5. A small-sized vibrating motor including a cylindrical motor housing, a rotor shaft that is bearing-supported inside the motor housing, a magnet and coil assembled oppositely through an air gap on the center line of the rotor shaft, a commutator fixed on the center line of the rotor shaft, brush seats made of insulating resin fitted and fixed at one end of the motor housing, a pair of brushes and respective leads held by the brush seats in rubbing contact with the commutator, a pair of power terminals mounted outside the motor housing, and an eccentric weight mounted on one end of the rotor shaft that projects outside the motor housing, the coil being electrically connected to the commutator, the power terminals being electrically connected to the respective leads of brushes, and the power terminals conducting electricity by means of pressure contact with power supply lands on a circuit board, characterized in that there is provided a terminal seat that also serves as the brush seats, a pair of support pins are held by the terminal seat so as to project in a direction approximately parallel to a surface of the circuit board and in a cylinder axial direction of the motor housing from the end surface of the terminal seat, respective leads are provided in a plane direction perpendicular to the cylinder axial direction of the motor housing so as to come out from the end surface of the terminal seat, and there are provided a pair of torsion coil springs as the power terminals that have central spirals fitting over the axes of the support pins, ends projecting outward from the terminal seat as points of contact with the power supply lands, and opposite ends connected to the respective leads of brushes.

6. A portable information equipment, characterized by being equipped with the small-sized vibrating motor as described in claim 5.

* * * * *